April 11, 1933.   P. J. FRIAS ET AL   1,903,714
SYSTEM FOR THE TRANSMISSION OF ROTARY MOTION
Filed March 7, 1932    5 Sheets-Sheet 5

Fig. 11

INVENTORS
P. J. Frias
C. Jones
M. Cheru
By: Marks & Clerk
Attys.

Patented Apr. 11, 1933

1,903,714

UNITED STATES PATENT OFFICE

PASTOR J. FRIAS, CLEMENTE JONES, AND MARCELO CHERU, OF BUENOS AIRES, ARGENTINA

SYSTEM FOR THE TRANSMISSION OF ROTARY MOTION

Application filed March 7, 1932. Serial No. 597,332.

This invention relates to a novel and improved system for the transmission of rotary motion and substantially has for an object a system which allows of rotary motion being transmitted from a driving shaft to a driven shaft in a progressive manner, from a condition of rest to the maximum of speed, in either direction.

A further object of the invention is to provide a system of the kind set forth which shall be of compact construction, smooth running and free from mechanisms of any kind liable to cause jerks or knocks and the operation of which may be performed by one single mechanism.

A still further object of the invention is to provide a transmission device which shall be particularly adapted for use in connection with cars provided with an internal combustion engine, in substitution of the usual clutch, change speed gear and reversal mechanisms and allow of the apparatus to pass from a condition of rest to that of full running, in an absolutely progressive manner, as well as of stopping and reversing the system, and running of the same as a free wheel.

Other objects of the invention will be pointed out in the course of this specification.

The invention is based on the use of a system of differential gears and essentially consists in providing means for releasing or locking the planetaries in relation to their bearing case.

It is a well known fact that in a differential gear in which one of the concentric shafts is a driving shaft and the other a driven shaft, rotation of this latter may be obtained, in a direction inverse to that of the driving shaft, from zero movement to the maximum of speed, by adjusting the rotary speed of the case of the planetary wheels, as by means of a brake band which applies a greater or lesser degree of pressure to the outer cylindrical surface of the gear case. In order to cause the driven shaft to revolve in the same direction as the driving shaft, it will be necessary to prevent the planetary wheels from revolving on their bearing and it is this particular fact which constitutes the basis of this invention.

In a preferred embodiment of the same, between the central pinion of one of the shafts and its planetary wheels, a gear pump is formed, in which circulation may be free or may be obstructed by means of a suitable set of valves. When interrupting said circulation, the planetary wheels will become locked and the gear case will be obliged to rotate with the same speed as the central shaft, the conjoint of the parts thus forming a rigid coupling device. By conveniently combining the operation of the case brake band and of said valves, rotation in either direction may be obtained in an absolutely progressive or gradual manner.

On the other hand, the liquid used in the pump being oil which is caused to circulate through the entire apparatus, a thorough lubrication of all parts of the same will simultaneously be performed.

The apparatus forming the object of this invention, is also adapted to operate as a free wheel, as will hereinafter be described.

In connection with this apparatus, also an operating mechanism, consisting of one single device, such as a pedal, is provided for performing the coordinate operation of the brake and valves and of the governing devices of the engine, besides the auxiliary independent regulation of the same.

In one form of construction of the device, clutch disks are provided for coupling the case and the driving shaft in one operation, simultaneously with the locking of the planetaries. The compression of said disks is performed by the pressure exerted by the oil on the closure of the valves of the pump. By this means, the stresses to which the gear teeth are submitted, will be considerably reduced.

In order that the invention may be clearly understood and readily carried into practice, an embodiment of the same has been shown, by way of example, in the accompanying illustrative drawings, wherein:—

In all the figures the same numeral references indicate the same parts.

Figure 1:
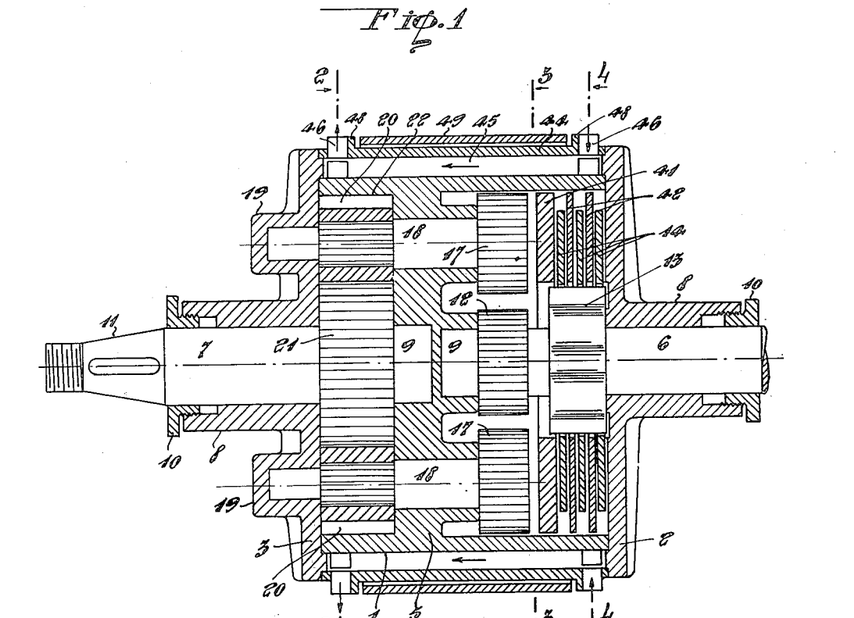
Figure 1 shows a longitudinal section of the apparatus which forms the object of this invention and the arrangement of which includes the use of frictional clutch disks.

In the first illustrated form of the invention, the apparatus comprises a cylindrical case 1, closed at either end by two caps 2 and 3, secured one to another and to the case by means of bolts 4. The case 1 is provided with a transverse partition wall 5, so as to divide the same into two chambers, one corresponding with the side of the shaft 6, coupled to the engine, and the other with the side in which is situated the shaft 7, connected to the transmission.

The shafts 6 and 7 are concentric with the case and are arranged axially one behind the other. Said shafts 6 and 7 revolve in bearings 8, formed in the caps 2 and 3 and in bearings 9, formed in the partition 5. At the end of the bearings 8 are provided suitable stuffing boxes 10, for preventing the oil from escaping from the case. Each shaft 6 and 7 is formed with an outer conical extension 11, by means of which a rigid coupling is established with the engine and the transmission, respectively.

Within the case, the shaft 6 carries a pinion 12, adjacent to the partition 5, and a grooved hub 13 for engaging with the clutch disks 14. The pinion 12 is in mesh with two intermediate idle pinions 15, arranged diametrically opposite to the same and which revolve on studs 16, screwed into the partition 5.

These pinions in turn engage each with a planetary pinion 17, integral with a shaft 18 which extends through the partition 5 and rotates in a bearing seat formed in the same and in another bearing seat 19, formed in the cap 3. The part of the shaft 18 which extends through the chamber on the other side of the partition 5, is grooved and on the same is keyed a pinion 20, formed with corresponding grooves, so as to rigidly connect said pinion with said shaft 18. A pair of such diametrically opposite shafts 18 is provided, carrying pinions 17 and 20 which thus form a planetary system in relation to the central shaft of the case 1.

The pinions 20, in turn, engage with a pinion 21, formed integral with the central shaft 7 and which transmits motion to the road wheels of the car. Said pinion 21, together with the pinions 20, form a double gear pump, for which purpose they have been arranged to revolve with a snug fitting between the partition 5, the cap 3 and the concentric parts 22, formed in the case 1. The arrows shown in Figure 2 indicate the normal circulation of the fluid contained within said pump. Between the solid parts 22 there are formed two symmetrical ducts 23 which extend from the point of engagement between one of the pinions 20 and the central pinion 21 to the point of engagement between the other pinion 20 and said central pinion 21.

Figure 2:
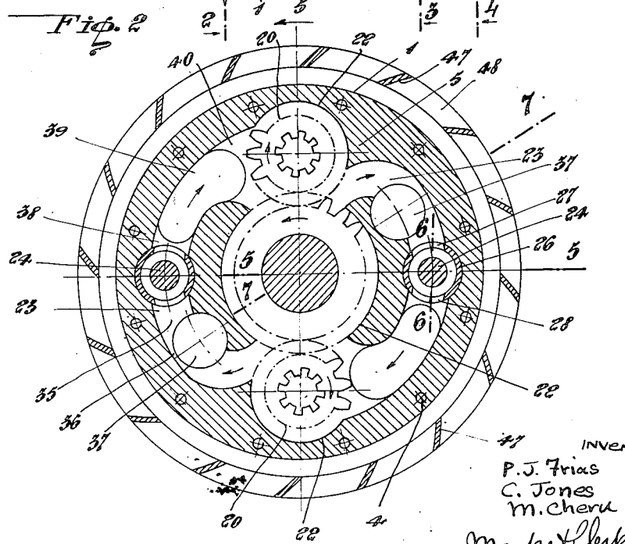
Figure 2 is a section taken on the line 2—2 of Fig. 1.
Figure 3:
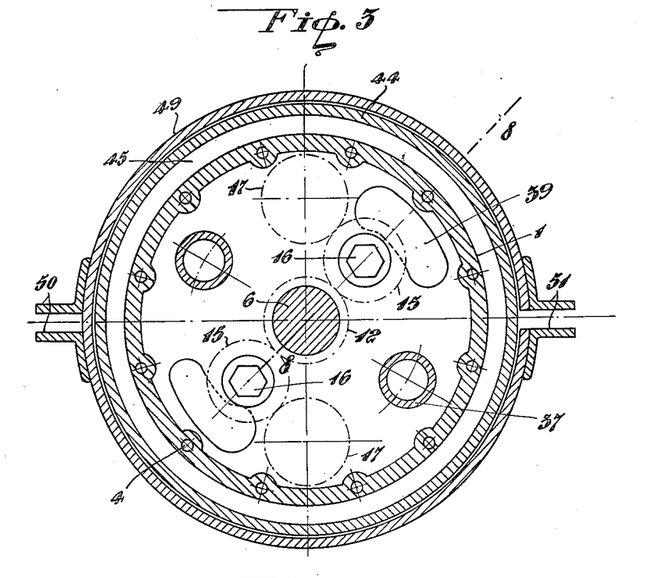
Figure 3 shows a section taken on the line 3—3 of Figure 1.
Figure 4:
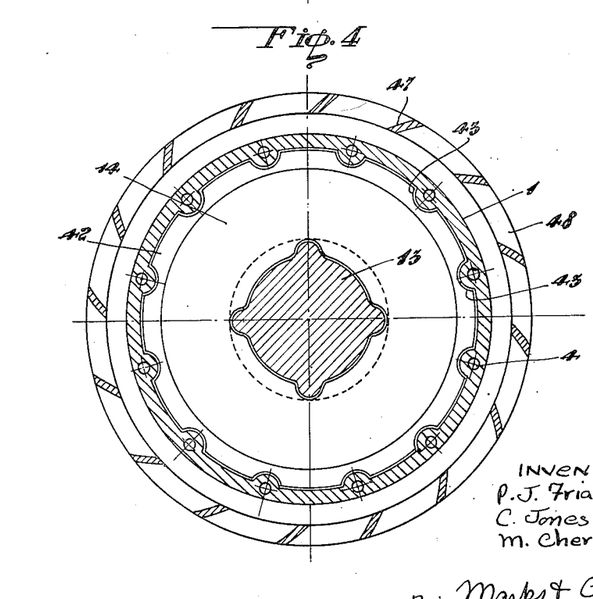
Figure 4 is a section taken on the line 4—4 of Figure 1.
Figure 5:
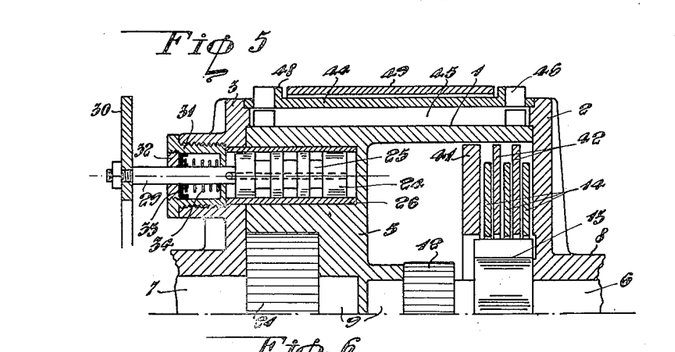
Figure 5 illustrates a partial longitudinal section on the line 5—5 of Figure 2.
Figure 6:
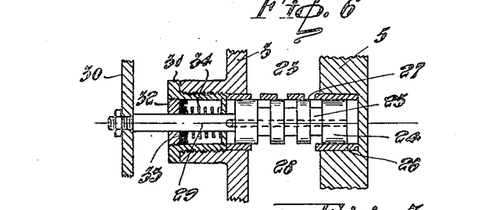
Figure 6 shows a partial section of a valve, taken on the line 6—6 of Figure 2.
Figure 7:
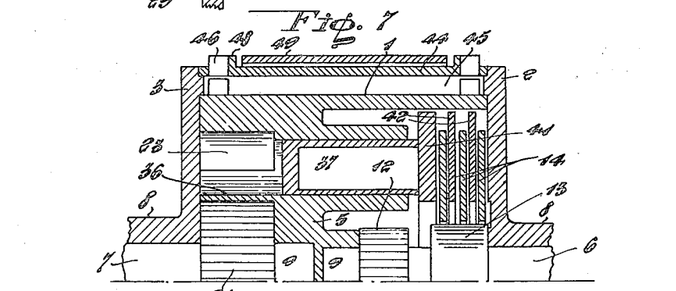
Figure 7 is a partial longitudinal section on the line 7—7 of Figure 2.
Figure 8:
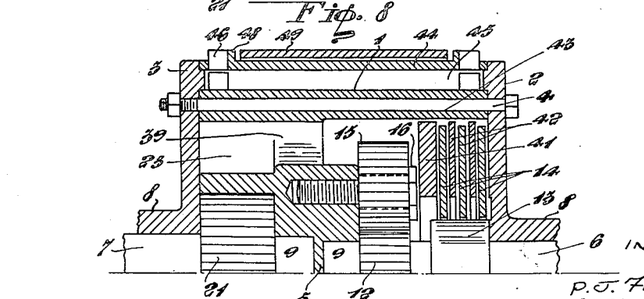
Figure 8 is a partial longitudinal section taken on the line 8—8 of Figure 3.

In the passage of each of said ducts 23, a regulating valve device is arranged, consisting of a cylindrical piston 24, formed with annular grooves 25 and adapted to slide in an endwise direction within a cylindrical sleeve 26, sunk into a cylindrical cavity of the solid portion 22, arranged at the passage of the duct 23. At the outlet side of the pump, said sleeve is provided with a series of orifices 27, corresponding with the grooves of the piston, while at the opposite side, said sleeve is formed with a large opening 28. The piston 24 is adapted to perform a small longitudinal movement, of sufficient extent for reaching from the complete aperture of the orifices 27 to its obturation by the cylindrical parts situated between said annular grooves. The outer end of the piston carries a rod 29 which protrudes from the case and is secured to a disk 30, concentrical with the case 1 which serves for simultaneously operating both valves, as will hereinafter be explained.

The rod 29 extends from the case 1 through a stuffing box formed within the cap 3. Said stuffing box comprises a threaded cup 31, screwed into a circular projection formed on the case cap 3 and bearing with its bottom against the end of the sleeve 26, a threaded washer 32, screwed into the outer end of the cup and a leather packing 33, pressed onto the inner side of said washer by means of a coiled spring 34, seated at its opposite end on the bottom of the cup.

The portion of the duct 23, situated between the outlet of the pump and the valve, forms a compression chamber, indicated at 35, into which opens a cylinder 36, formed in the partition 5 and extending parallel with the shaft of the case 1. Said cylinder is open at either end and within the same slides a piston 37, of which the end situated opposite to the chamber 35 projects into the chamber of the planetary gears 17 and the clutch disks.

The portion of the duct 23 which extends from the valve to the inlet side of the pump, forms the suction chamber 38 of the pump which communicates by means of an opening 39 in the partition 5, with the compartment of the planetary gears 17 and the clutch disks, thereby allowing of the oil to circulate through the entire case 1. In order to avoid the effect of the centrifugal force which by compressing the oil toward the periphery of the case, would not permit, in the event of said case being entirely filled, of said oil reaching the point of engagement of the pinions 20 and 21, said suction chamber is so formed that it will allow of the oil coming into contact with the pinion 20 at a place nearer to the periphery of the case than the said point of engagement, the extension formed for this purpose at the cavity of said chamber being indicated at 40.

Referring again to the piston 37, operated by the pressure of the oil in the chamber 35, it was stated that said piston projects beyond the other side of the partition 5 into the chamber of the planetary gears 17 and of the clutch disks. Said piston which applies pressure to said disks, bears on this side against a rather thick and rigid annular disk 41, which has for its object to distribute the pressure of both pistons 37 over the entire surface of the clutch disks. The clutch disks comprise the set of annular disks 14, above referred to, mounted on the shaft 6, and a set of annular disks 42, inserted between the former and rotating with the case 1, which for that purpose is provided with longitudinal ribs 43 which engage with corresponding notches, formed on the disks 42.

The first of said set of internal disks 14 bears on the cap 2 and the last of the external disks 42 bears against the thick disk 41. It will be understood that the internal disks rotate with the shaft 6 and the external disks with the case 1 and that, when the pressure of the pistons 37 becomes sufficient for preventing the sliding motion between both of said sets of disks, the shaft 6 will be rendered rigid with, or locked to said case 1, which will thereupon rotate at the same speed as said shaft.

The brake portion of the device which serves to lock the case 1, comprises a cylindrical sleeve 44, concentric with the case 1 and supported by the periphery of the caps 2 and 3 which extend beyond said case, so that between the case and the sleeve an annular space 45 will be provided, for allowing of a circulation of cooling air. Said air enters by one end of the sleeve 44 and is discharged by the other. To that end, said sleeve is provided at each end with a circumferential opening 46, through which extend paddles 47, set at a suitable incline, so that those of one end will tend to direct the air toward the space 45 while the others will operate to discharge the same, circulation thus taking place in the direction indicated by the arrows. Said paddles are reinforced by means of flanges 48, said flanges serving at the same time as a guide for the brake band 49 which surrounds the sleeve 44. It will be seen that by such flow of cool air, the heating caused by the friction of the brake will be considerably reduced.

Said brake band is secured at the middle thereof to a suitable stationary part of the chassis or underframe, by means of ears or lugs 50, while its free ends are provided with ears 51, adapted to be acted upon by the mechanism which operates to apply the brake.

Figures 9, 10:
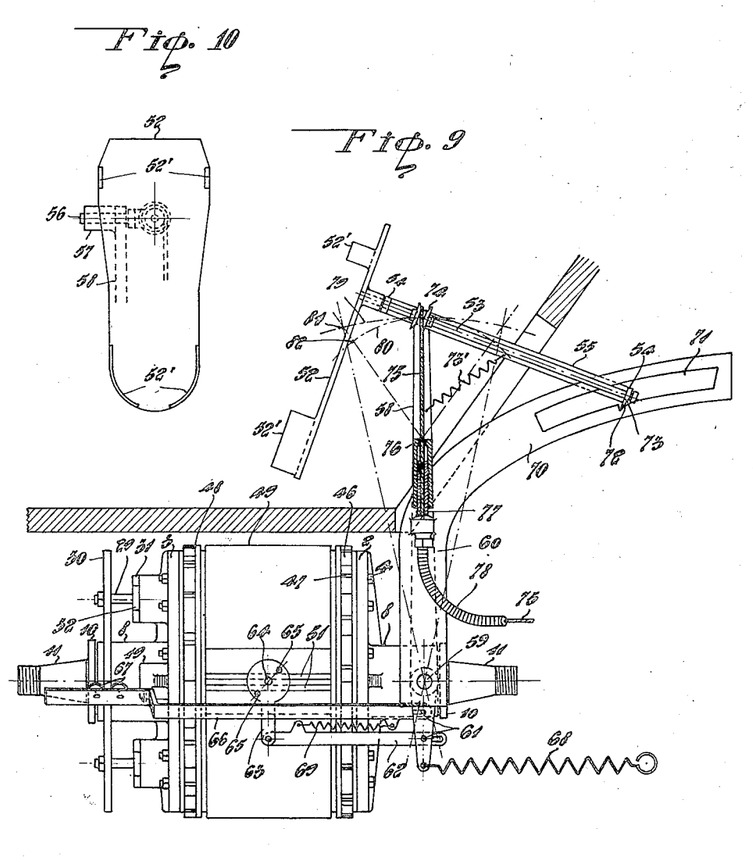
Figure 9 illustrates a side elevation of the device shown in the foregoing views, together with an operating mechanism combined with the throttle device.
Figure 10 shows a front view of the pedal for operating said mechanism.

In Figures 9 and 10 the operating mechanism of the apparatus is shown, which comprises a pedal 52, consisting of a foot plate provided with upstanding flanges 52' for getting a good hold thereon. Said pedal is secured to a spindle 53, arranged perpendicular to the same and revolving in ears 54, formed at either end of a straight bar 55, provided in turn with a fixed perpendicular stud 56 which enables the same to oscillate on a bearing 57 formed by the upper end of a lever 58, mounted to oscillate at 59 on a bracket 60 secured to the underframe of the car.

The lower end of the lever 58 carries two studs 61, placed at a small distance one from the other. One of the studs slides within an elongated slot formed in a bar 62 connected to a small lever 63 which oscillates on a stationary pin 64 and carries two studs, adapted to respectively apply pressure on the ears 51 of the brake band. The oscillation of the lever 63 in one direction will release the brake while movement in the opposite direction will cause the brake to be applied.

The other stud 61 of the lever 58 slides within an elongated slot of a suitably guided bar 66, carrying on its end two rollers 67 between which passes, with a snug fit, the disk 30 which operates the valves 24.

To the lower end of the lever 58 is connected a tension spring 68, secured at its other end to a suitable part of the underframe and which tends to normally keep the pedal in its rearward position.

Between the two bars 62 and 66, a coiled spring 69 is provided which tends to release the brake and open the valves, thereby holding the lever 58 in its dead centre position illustrated in the drawings, with the studs 61 in contact with the ends of the elongated slots of said bars, in which position the brake will be released and the valves will be open.

The stationary bracket 60 is provided with an upper arched extension 70, arranged in a forward direction and provided with a curved slot 71 within which slides the front ear 54 of the pedal spindle 55, thereby conveniently guiding and limiting the movements of the same. The slot 71 is provided between its ends with a stop notch 72, adapted to operate in one direction only, for the retention, at its backward movement, of said ear 54, shaped to that end of a triangular profile as shown at 73. A coiled spring 73' connected to the bar 55 and lever 58 normally tends to keep the ear 54 in engagement with said notch 72. When pushing the pedal, no retention takes place but when the same is allowed to recede, it will be necessary to apply pressure with the heel so as to disengage the ear 54 from the notch 72 and allow of the complete recess of the device.

The point of retention or engagement corresponds with the dead centre of the lever 58.

Opposite to the fulcrum of the bar 55, the spindle 53 is provided with a grooved pulley 74 on which passes a flexible cord 75 which operates, in any suitable manner not shown, the throttle gate of the admission tube. The cord passes into a suitably shaped mouthpiece 76 screwed onto a tube 77 secured to the bracket 60, said tube being connected at its other end to the flexible tube 78, through which also extends the flexible cord 75. The mouthpiece 76 is arranged vertically on the line corresponding with the dead centre of the lever 58. By means of this arrangement, the cord 75 is submitted to traction every time the lever is displaced from its dead centre, owing to the point of oscillation of the cord, formed by the mouthpiece 76, being offset with regard to the centre of oscillation of the lever 58. This latter performs the arch indicated at 79, while by said mouthpiece an arch 80 would be described. The distance between the points 81 and 82 which respectively correspond with the ends of said arches or curves, indicates the displacement of the cord, the purpose of which will hereinafter be explained. In order to adjust said displacement, the mouthpiece 76 is formed with screw threads, for varying its height and thereby altering the arch 80.

Independently from the displacement just described, the cord 75 may perform another movement by means of the lateral oscillation of the pedal on its axle 53, whereby the said cord will be wound on or off the pulley 74.

Figure 11:
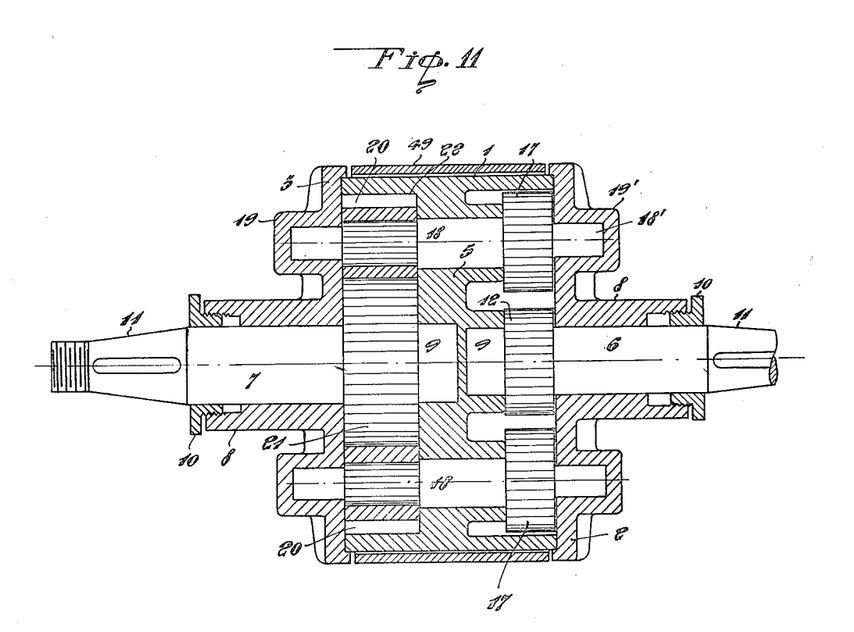
Figure 11 is a longitudinal section, similar to Figure 1, of a simplified form of the invention, in which the clutch discs and the cooling of the brake are suppressed.

In the alternate construction shown in Figure 11, the device has been simplified by omitting therefrom the clutch disks and the brake cylinder. According to the dimensions of the apparatus or the degree of power to be transmitted, it will in certain cases be possible to perform the locking of the case by simply blocking the oil between the teeth of the pinions 20 and 21 of the pump, without risk of damaging said teeth. The same applies to the operation of the brake—if overheating is not to be feared, the brake band 49 might be applied directly to the outer cylindrical surface of the case 1. As to the remainder of the parts, they will be arranged in the same manner as described in connection with Figures 1 to 8. The omission of the clutch disks permits of conveniently varying a detail of construction in that the shafts 18' of the planetaries 17 may be extended, so that they may rotate in bearings 19' formed in the cap 2. Similarly, in a manner which it has not been deemed necessary to illustrate, the short axles 16 which bear the intermediate gears 15 in the construction first above described, might be replaced by longer axles, journalled in the partition 5 and the cap 2, similarly to the shafts 18'.

The operation of the apparatus forming the object of this invention is as follows: As has been stated at the commencement, the series of gears, not taking into account its operation as a pump, constitutes a differential system in which the drive shaft 6 operates the driven shaft 7 in a direction inverse to that of its own rotation when the case of the planetaries is locked and allows of the rotation of said shaft 7 being varied from a condition of rest to a maximum of speed, according to whether said case is left to rotate freely or is submitted to brake pressure. This is classical. For obtaining the rotation of the driven shaft in the same direction as the driving shaft 6 in all degrees of speed up to the maximum which is that of the shaft 6, it will be necessary to more or less brake the planetaries or their intermediate or compensating gears on their supports and on this is based this invention, in the preferred embodiment of which the planetaries are braked to the desired degree by the operation of the valves which act to more or less obstruct the flow of the oil in its circulation through the pump, formed by the pinion 21 of the driven shaft 7 and the planetaries 20. The said oil pump operates as follows: The oil forced by the engagement of the pinion 21 with one of the pinions 20 flows through the duct 23 to the suction point of engagement between said pinion 21 and the other pinion 20, thereby causing a similar action between this latter and the former, so that two currents or flows of oil in the same direction will be obtained in the two ducts or channels 23. It will be understood that while such circulation takes place freely, the pinions 20 will keep rotating freely in their bearings of the case 1, while when restricting or obstructing said circulation, the case 1 will become partially and even entirely dependent of the pinion 21.

These several actions which in the apparatus described are simply caused by operating the brake 49 and the valves 24, allow of easily and smoothly performing the following six operations, viz: uncoupling, progressive coupling, direct coupling, free wheel running, braking and reversal.

In the uncoupled or disengaged position, the apparatus permits of the engine to run freely, without acting on the driven shaft 7, which in consequence may remain stationary or keep revolving. In this position the brake band 49 will be slack and the valves 24 will allow of the free passage of the oil through the ducts 23. At the same time, the pump 20, 21 will work without pressure, so that the several gears forming the same, will be free to attain a relative degree of speed according to the relations of the gears which form the differential. In the case of an apparatus provided with clutch disks, these latter will neither act, owing to the lack of pressure on the piston 37, the case 1 being thus left entirely free with regard to the shaft 6. Under these conditions, if the vehicle be at rest, the case 1 will revolve at a medium speed, between zero speed of the pinion 21 and that of the engine shaft.

For performing a progressive coupling, or to speed the car up to a desired degree from the position of rest, it will be necessary to progressively close the valves 24, so as to generate pressure within the compression chambers 35 of the pump while simultaneously feeding the engine, as will be natural, in accordance with the degree of power required by operating the throttle device. The pressure of the oil within the chambers 35 will interfere with the rotation of the pinions 20, as will normally be the case in a gear pump when the flow of the liquid therein is obstructed. Such action tends to block or lock the planetaries and transform the case and gears into a simple rigid coupling between the shafts 6 and 7. Before reaching said condition of locking, the case 1 will increase in speed, beyond the relative degree of speed which it possessed at its uncoupled or unlocked position, thereby causing the gradual coupling or engagement of the driven shaft 7. During all this time, the brake band remains in its slack condition. In the case of an apparatus provided with clutch disks, these latter will cooperate with the planetaries in rendering the case 1 fast with the shaft 6, owing to the pressure of the oil in the chambers 35 operating on the pistons 37, which latter act to compress the pile of disks 14—42. This compression also will be gradual and proportionate to the obturation of the valves 24.

It will therefore be seen that by closing the valves more or less speedily, the passing, always progressive, from the uncoupled position to that of direct coupling, will be performed with more or less speed.

The position of direct coupling or normal condition of forward running, in which the shafts 6 and 7 revolve at the same speed, simply means the final condition of the progressive starting operation, in which the valves 24 are completely closed, the planetary gears locked and the clutch disks entirely compressed, in which position the case 1 will rotate at the same speed as the shafts 6 and 7 and the brake band will remain slack.

Between the uncoupled position and the position of direct coupling, the apparatus may remain in an intermediate position during a certain lapse of time, when it will operate as a speed reducer, with the valves half-way closed so that the driven shaft will rotate at a lower speed than the driving shaft. This operation is performed every time the car is to drag heavily, as when climbing an incline or when passing a bog, as in this case the car must advance slowly at high engine speed, in order to use all its power, as occurs in connection with the ordinary speed change devices, set at intermediate speed. By more or less obturating the valves, the necessary reduction will be obtained to a degree comprised between the uncoupled position and that of direct coupling.

The phenomenon of the free wheel is brought about in this apparatus in two ways, one entirely automatical and the other by means of the operating devices. As is well known, this condition arises when the transmission shaft tends to revolve at a greater speed than the engine shaft. Its automatic performance in the apparatus takes place as follows: The device being in the position of direct coupling, that is, with the valves 24 closed, the oil within the chambers 35 will be compressed and the shaft 6 will carry along with it the conjoint, but as the speed of the shaft 7 increases above that which it tends to transmit to the shaft 6, the planetaries will tend to revolve in a direction inverse to that in which they rotated during the start, that is to say, that the pump 20—21 will tend to cause the flow of the oil in a direction inverse to normal, so that said pump will no longer be blocked although the valves 24 remain closed, because the oil will find its way into the case 1 which in practice is not entirely filled, with the result that in the said direction blocking of the pump cannot take place and the shafts 6 and 7 will no longer be engaged, thereby allowing of the shaft 7 increasing its speed above that of the shaft 6. The uselessness of keeping the case completely filled with oil is due to the fact that centrifugal force will compel the oil to feed the admission of the pump, no matter how small be the amount of oil existing therein.

The second manner of obtaining the operation of the device as a free wheel, consists in returning to the uncoupled position which, though theoretically feasible in any coupling system, may in the present case be performed practically on account of the gears being always in engagement and no change speed device has to be operated for placing the driving shaft again in relation to the driven shaft. Besides, as will be explained later on, a relation of dependence has been established between the clutch and the throttle device which permits of obtaining the free wheel by a single operation, with the engine running at its minimum speed.

Braking is performed by opening the valves 24 and applying the brake band 49. The aperture of the valves 24 will cause the independence of the shafts 6 and 7, owing to the planetaries being allowed to rotate freely while the case 1 is still free to rotate at the relative speed between the speeds of the two shafts, but as soon as the speed of said case slows down by the action of the brake 49, the planetaries will tend to reduce and reverse the speed of the shaft 7 with regard to the shaft 6, with the result that the car will be stopped.

If braking be continued till stopping the rotation of the case 1, reversal will take place, owing to the well known effect of the differential. In this operation, the valves 24 are open and the planetaries reverse the direction of rotation of the shaft 7 with regard to the shaft 6. This operation also is performed progressively on account of the gradual stopping of the case 1.

It will be seen that the clutch disks will be loose and rendered inoperative whenever the valves 24 are opened and that they will render the case 1 independent from the shaft 6 when running as a free wheel, when braking, reversing and uncoupling.

In order to coordinate the operations of the valves 24, of the brake and of the throttle device, an auxiliary mechanism shown in Figures 9 to 10 has been provided, the construction of which has already been described. Said mechanism permits of performing all the operations referred to by means of a single pedal.

Said pedal is arranged for performing three movements, one causing the oscillation of the lever 58, another to cause oscillation on the stud 56 for disengagement from the dead centre established by the notch 72 in the arch or sector 70 and a third oscillatory movement on the axle 53, for the purpose of operating the throttle independently of the position of the lever 58.

The dead centre position at which the ear 54 is engaged with the notch 72 of the sector 71, imparts a vertical position to the lever 58, in which condition the bar 66 keeps the valves 24 in their open position and the bar 62 keeps the brake band 49 slack. Owing to the elongated slots of said bars in which slide the pins 61 of the lever 58, each bar only is acted upon during one half of the displacement of said lever, that is, the bar 66 operates from the dead centre towards the right and the bar 62 from said dead centre towards the left. To cause the engagement of the clutch, the heel must depress the pedal 52 in order to release the dog 73 of the ear 54 from the notch 72, after which the pedal is gradually or progressively released and allowed to recede under the action of the spring 68. During this operation, the bar 62 does not act on the brake band while the bar 66 will progressively close the valves 24 by means of the movement imparted by their rollers to the disk integral with said valves, indicated at 30. As has been explained before, the oscillation of the lever 58 applies traction to the cord or cable 25 which operates the throttle gate of the admission pipe, thereby automatically increasing the speed of the engine to the measure required by the starting of the shaft 7. As the lever returns to its dead centre, the speed of the engine will also automatically be slowed down.

For braking and reversal, it will be necessary to push the pedal 52 beyond its dead centre, which will cause the bar 66 to keep the valves 24 open, while the bar 62 will progressively apply the brake band 49 by means of the lever 63, of which the studs 65 act to approach the ends of the band one to the other. As has already been explained, reversal simply consists in continuing the braking action. During this operation, a pull is exerted on the cord 75, so as to increase the speed of the motor as the car starts running backwards. When the pedal is released from the braking or reversal position, it will automatically return to its position of rest, in which the shaft 7 is uncoupled and the engine runs at reduced speed. It will be noted that it will be impossible to suddenly apply the brake or reverse with the apparatus in its direct coupling position, it being necessary to previously pass by the dead centre position, thereby assuring the rational passing from one position to another.

The automatical speeding up of the motor, caused by the operation of the lever 58, is controlled so as to obtain a minimum of power consistent with keeping the car in direct coupling, it being necessary to leave an ample margin for increase of speed up to the maximum speed attainable by the car. This latter speeding up operation may be performed at will by the driver, by oscillating the pedal 52 on its axle 53, for which purpose he will perform a rotary movement with the foot. By said oscillation a longer or shorter section of the cord 75 will be wound on the pulley 74 and thus, a supplementary movement of the throttle gate of the admission pipe of the engine will be caused.

From the foregoing it will have been understood that by means of the apparatus in accordance with my invention and by the operation of one single device, any kind of running may be imparted to the car as well as stopping of the same, always in a progressive manner, thereby obtaining a most rapid speeding up, without noise nor jerks or knocks caused by the impact of mechanical parts. No wear nor overheating will be caused, as the oil of the very pump will act as a lubricant. The duration of the apparatus will thus considerably be prolonged.

As has already been stated at the commencement of this specification, the transmission system in accordance with this invention is adapted for use not only in connection with either road or railway vehicles, maritime or air crafts, but also with any other kind of machines or engines requiring progressive variations in the transmission of power.

It will be evident that several modifications of construction and arrangement may be introduced without departing from the scope or nature of the invention, which will be clearly set forth in the claims hereto annexed.

Having now particularly described and ascertained the nature of our said invention and in what manner the same is to be performed, we declare that what we claim and desire to secure by Letters Patent, is:—

1. Transmission apparatus for rotatory motion, comprising a cylindrical tight case for containing and supporting the mechanism, provided with a transverse partition, a driving shaft extending axially into said case up to the transverse partition, a driven shaft extending axially into the opposite part of said case, a central pinion on each shaft in the interior of said case, planetary shafts which extend through said partition, planetary pinions integral with said shafts which extend through said partition, compensating pinions suitably supported for engaging with the driving pinion and said planetary pinions, planetary pinions integral with the shafts of the aforesaid planetary pinions and in engagement with the central pinion of the driven shaft, a housing snugly fitting against the sides and periphery of the last mentioned planetary pinions and central pinion, forming together with the same a gear pump, passages for the fluild to be pumped between the forcing side and the suction side of the pump, a cylindrical opening parallel to the axis of the housing at each passage for the fluid, a stationary sleeve in said opening, provided with orifices on the forcing side, a piston sliding within said sleeve, provided with annular grooves, the position of which in relation to said orifices allows of controlling the flow of the fluid, a rod extending from said piston outside the housing, a stuffing box on each rod, an annular disk, perpendicular to and concentrical with the shaft of the case, to which are secured the piston rods, means for operating from outside said disk, so as to move the same in a parallel direction to the case, and means for braking said cylindrical case.

2. Transmission apparatus for rotatory motion, comprising a driven shaft a differential system including a case, a pinion on the driven shaft and planetaries arranged to form a gear pump with closed circulation, means for regulating said circulation from the free flow to the complete obstruction thereof and thereby release or lock the planetaries on their supporting case, means for frictional coupling between the driving shaft and said supporting case, means for operating said frictional coupling means by the pressure of the fluid of the pump, existing between the forcing side and the regulating means of the same, and means for braking said case.

3. Transmission apparatus for rotatory motion, comprising a cylindrical tight case for enclosing and supporting the mechanism, provided with a transverse partition, a driving shaft extending axially into said case till the transversal partition, a driven shaft extending axially into the opposite part of said case, a central pinion on either shaft in the interior of the case, planetary shafts which extend through said partition, planetary pinions integral with the shafts which extend through said partition, compensating pinions conveniently supported for engagement with the driving pinion and said planetary pinion, planetary pinions integral with the shafts of the aforesaid planetary pinions and engaging with the central pinion of the driven shaft, a housing fitted against the sides and periphery of the last mentioned planetary pinions and the central pinion, forming together with the same a gear pump, passages for the fluid to be pumped between the forcing side and suction side, valve means arranged at both passages for regulating the circulation of the fluid, means for braking the cylindrical case, frictional clutch disks freely mounted within said case in the direction of the shaft, some of said disks revolving with the case and others with the driving shaft, these latter being inserted between the former, a cyclindrical opening parallel with the shaft, extending through the transversal partition wall of the case, from either circulation channel of the pump within which pressure is generated, and a piston in each cylindrical opening adapted for being acted upon by the pressure of the fluid and transmit the same to the pile of disks.

4. Transmission apparatus for rotatory motion, for transmitting the power between an internal combustion engine of a vehicle and the road wheels of the same, comprising a differential system, one of the shafts of which is a driving shaft and the other a driven shaft, a brake for progressively releasing or locking the case of the planetaries of said system, means for progressively releasing or locking the planetaries in relation to the case, an oscillatory lever, means connecting said lever to the brake of the case and to the means for releasing or locking the planetary pinions, in such a way that each will be acted upon from a dead centre position of the lever and by a movement of this latter in opposite direction one to the other, a spring which tends to carry the lever to the position of locked planetaries, a sector provided with a notch, a rocking lever pivoted to the end of said lever and the end of which slides within the sector provided with a notch corresponding with the dead centre, said end carrying a dog normally in engagement with said notch corresponding with the dead centre in opposition to said spring, an axle mounted on said rocking lever in a direction parallel with the same, a pedal secured to the end of said axle opposite to that of retention of the pivoted lever, a pulley mounted on said axle, opposite to the pivotal connection on said lever, a flexible cord wound on said pulley and attached at one end to the throttle device of the motor, a tube for the passage of said cord, secured in line with the dead centre position of the lever, in a manner to permit of varying the height of the inlet section of the tube into which enters the cord extending from the pulley.

5. Transmission apparatus for rotatory motion, comprising a tight cylindrical case for enclosing and supporting the mechanism, provided with a transverse partition, a driving shaft extending axially into said case up to the transverse partition, a driven shaft extending axially into the opposite part of said case, a central pinion on either shaft in the interior of said case, planetary shafts extending through said partition, planetary pinions integral with said planetary shafts, compensating pinions conveniently supported for engagement with the driving pinion and said planetaries, planetary pinions integral with the shafts of the aforesaid planetary pinions and engaging with the central pinion of the driven shaft, a housing snugly fitting against the sides and periphery of said latter planetaries and central pinion, forming together with the same a gear pump, channels for the fluid pumped between the forcing side and the suction side, a cylindrical sleeve concentrical with the case and surrounding the same, secured to said case and separated from the same by a space adapted for a circulation of air, said sleeve supporting a brake band for operating on said case, either end of said sleeve being provided with openings combined with suitable paddles, whereby the air will be drawn into said space by one end and expelled therefrom by the other, substantially as above described and for the purposes set forth.

In testimony whereof we affix our signatures.

PASTOR J. FRIAS.
CLEMENTE JONES.
MARCELO CHERU.